(12) United States Patent
Liao et al.

(10) Patent No.: US 7,262,777 B2
(45) Date of Patent: Aug. 28, 2007

(54) APPROXIMATION OF LEVEL OF DETAIL CALCULATION IN CUBIC MAPPING WITHOUT ATTRIBUTE DELTA FUNCTION

(75) Inventors: Qun Feng (Fred) Liao, San Jose, CA (US); Zhou (Mike) Hong, Cupertino, CA (US)

(73) Assignee: VIA Technologies, Inc., Taipei (TW)

( * ) Notice: Subject to any disclaimer, the term of this patent is extended or adjusted under 35 U.S.C. 154(b) by 0 days.

(21) Appl. No.: 10/784,113

(22) Filed: Feb. 20, 2004
(Under 37 CFR 1.47)

(65) Prior Publication Data
US 2005/0017983 A1    Jan. 27, 2005

Related U.S. Application Data

(60) Provisional application No. 60/449,123, filed on Feb. 20, 2003.

(51) Int. Cl.
G09G 5/00    (2006.01)

(52) U.S. Cl. ............... 345/582; 345/420; 345/587; 345/608; 345/630; 382/284; 382/293

(58) Field of Classification Search ............... 345/582, 345/587, 608
See application file for complete search history.

(56) References Cited

U.S. PATENT DOCUMENTS

| | | | | |
|---|---|---|---|---|
| 5,912,670 A | * | 6/1999 | Lipscomb et al. | 345/419 |
| 5,923,334 A | * | 7/1999 | Luken | 345/423 |
| 6,034,691 A | * | 3/2000 | Aono et al. | 345/582 |
| 6,236,405 B1 | * | 5/2001 | Schilling et al. | 345/582 |
| 6,246,422 B1 | * | 6/2001 | Emberling et al. | 345/552 |
| 6,424,351 B1 | * | 7/2002 | Bishop et al. | 345/582 |
| 6,664,963 B1 | * | 12/2003 | Zatz | 345/426 |
| 6,744,430 B1 | * | 6/2004 | Shimizu | 345/420 |
| 6,765,584 B1 | * | 7/2004 | Wloka et al. | 345/584 |
| 6,768,492 B2 | * | 7/2004 | Dorbie et al. | 345/582 |
| 6,850,242 B1 | * | 2/2005 | Saito | 345/582 |

(Continued)

OTHER PUBLICATIONS

"OpenGL Cube Map Texturing," NVIDIA Corporation, 1999. http://developer.nvidia.com/object/cube_map_ogl_tutorial.html.*

(Continued)

*Primary Examiner*—Kee M. Tung
*Assistant Examiner*—Antonio A Caschera
(74) *Attorney, Agent, or Firm*—Thomas, Kayden, Horstemeyer & Risley

(57) ABSTRACT

A method of cubic mapping with texturing is described. Neighboring pixels on an object are mapped to adjacent faces of the cube, but these adjacent faces do not guarantee continuity in the texture mip-map associated with each face. Therefore, the u and v texture map coordinates are adjusted after mapping to adjacent faces to make a continuity adjustment that insures that the LOD for the texture mip-map is the same for each adjacent face. The continuity adjustment includes either switching the u coordinate with the v coordinate or negating one of the coordinates or both. Additionally, if the u and v coordinates are normalized, the normalization may be compensated by adding or subtracting unity from the adjusted coordinate. After the continuity adjustment is made an approximation to the derivative is computed and used to determine the LOD for the mip-map. Texturing can then proceed using the LOD.

18 Claims, 10 Drawing Sheets

U.S. PATENT DOCUMENTS 6,975,319 B1 * 12/2005 Donovan et al. ........... 345/428

OTHER PUBLICATIONS

"Per-Pixel Lighting Intro," NVIDIA Corporation, 2000. http://developer.nvidia.com/object/perpixel_lighting_intro.html.*

NVIDIA document listing including publication dates for documents cited herein. http://developer.nvidia.com/object/all_docs_by_date.html.*

"Cube Maps," NVIDIA Corporation, 200a. http://developer.nvidia.com/object/cube_maps.html.*

* cited by examiner $c_1$ = texture 1
$c_2$ = texture 2
$c_3$ = texture 3

Mip Mapping

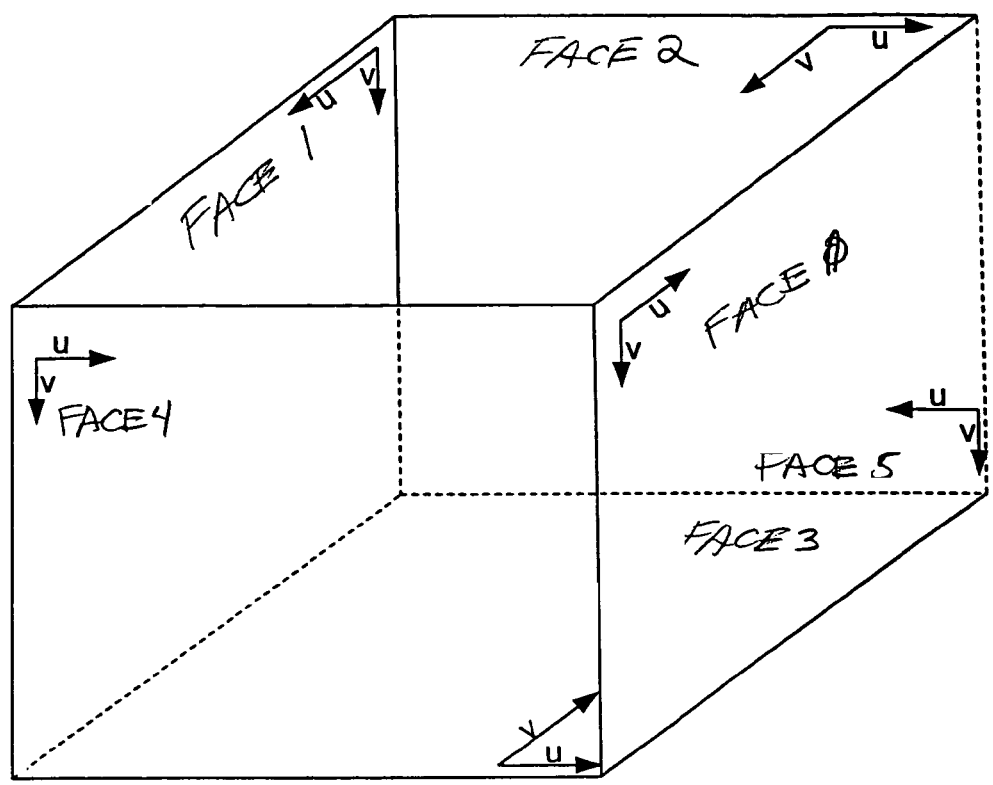
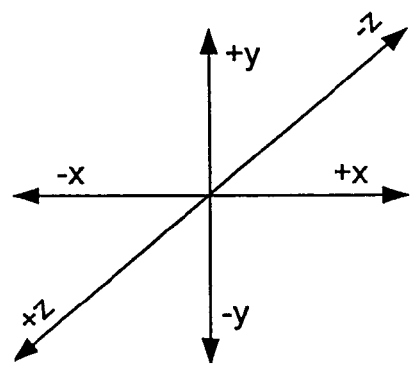
FIG 3

```
#define FACE_POS_NX 0
#define FACE_NEG_NX 1
#define FACE_POS_NY 2
#define FACE_NEG_NY 3
#define FACE_POS_NZ 4
define FACE_NEG_NZ 5 float absNx = fabs(Nx);
float absNy = fabs(Ny);
float absNz = fabs(Nz);

if (absNx > absNy && absNx > absNz) {//face major is X or -X
    if (Nx < 0) {
        fid = FACE_NEG_NX;
        U = Nz; V = -Ny; Major = -Nx;
    }
    else {
        fid = FACE_POS_NX;
        U = -Nz; V = -Ny; Major = Nx;
    }
}
else if (absNy > absNz) {//face major is Y or -Y
    if (Ny < 0) {
        fid = FACE_NEG_NY;
        U = Nx; V = -Nz; Major = -Ny;
    }
    else {
        fid = FACE_POS_NY;
        U = Nx; v = Nz; Major = Ny;
    }
}
else {//face major is Z or -Z
    if (Nz < 0) {
        fid = FACE_NEG_NZ;
        U = -Nx; V = -Ny; Major = -Nz;
    }
    else {
        fid = FACE_POS_NZ;
        U = Nx; V = -Ny; Major = Nz;
    }
}
```

FIG. 4

| Bits 3:0 | | | | | |
|---|---|---|---|---|---|
| Bits 5:4 | | 0000 | 1000 | 1011 | 1100 | 1111 |
| | 00 | X⇒X<br>X⇒-X<br>-X⇒X<br>-X⇒-X<br>Y⇒Y<br>Y⇒-Y<br>-Y⇒Y<br>-Y⇒-Y<br>Z⇒Z<br>Z⇒-Z<br>-Z⇒Z<br>-Z⇒-Z | X⇒Z<br>-X⇒-Z<br>Z⇒-X<br>-Z⇒X | X⇒-Y | | X⇒Y |
| | 01 | | -Y⇒Z<br>Z⇒Y | -Y⇒-X | -Y⇒-Z<br>-Z⇒-Y | -Y⇒X |
| | 10 | | X⇒-Z<br>-X⇒Z<br>Z⇒X<br>-Z⇒-X | -X⇒Y | | -X⇒-Y |
| | 11 | | Y⇒Z<br>Z⇒-Y | Y⇒X | Y⇒-Z<br>-Z⇒Y | Y⇒-X |

| 5 | 4 | 3 | 2 | 1 | 0 |
|---|---|---|---|---|---|
| 0=add<br>1=sub | 0=U<br>1=V | Need adding | | | Swap UV |

| | | |
|---|---|---|
| 0 | 0 | No flip |
| 0 | 1 | Flip U |
| 1 | 0 | Flip both UV |
| 1 | 1 | Flip V |

FIG. 6

```
uinte32 cube_adj_table [6][6] = {
    // 6 bit code for UV adjustment for x1 during x1-x0
    // operation. X1's face id and x0's face id are used to
    // index the table. x1 is either U or V.
    // bit[0]: swap UV;
    // bit[2:1]: 10=flip both UV, 00= no flip, 01=flip U,
    // 11=flip V;
    // bit[3]: need adding;
    // bit[5]: 0=add, 1=sub;
    // bit[4]: 0=U, 1=V;
    0x00, //   X    X
    0x00, //   X   -X
    0x0f, //   X    Y
    0x0b, //   X   -Y
    0x08, //   X    Z
    0x28, //   X   -Z 0x00, //  -X    X
    0x00, //  -X   -X
    0x2b, //  -X    Y
    0x2f, //  -X   -Y
    0x28, //  -X    Z
    0x08, //  -X   -Z 0x3b, //   Y    X
    0x3f, //   Y   -X
    0x00, //   Y    Y
    0x00, //   Y   -Y
    0x38, //   Y    Z
    0x3c, //   Y   -Z 0x1f, //  -Y    X
    0x1b, //  -Y   -X
    0x00, //  -Y    Y
    0x00, //  -Y   -Y
    0x18, //  -Y    Z
    0x1c, //  -Y   -Z 0x28, //   Z    X
    0x08, //   Z   -X
    0x18, //   Z    Y
    0x38, //   Z   -Y
    0x00, //   Z    Z
    0x00, //   Z   -Z 0x08, //  -Z    X
    0x28, //  -Z   -X
    0x3c, //  -Z    Y
    0x1c, //  -Z   -Y
    0x00, //  -Z    Z
    0x00, //  -Z   -Z
};
```

FIG 7A

```
uint8 code = cube_adj_table[ fid[1] [fid[0] ];
for (type = 0, 1) repeat { //type 0 is du/dx, type 1 is dv/dx
    bool swap_UV = (code&1);
    bool flip_UV = (( code >> 1&3)==2) ||
                   (( code >> 1&1)         &&
                    type == (code >> 2&1));
    bool add2_UV = !(code >> 5&1)  &&
                    (code >> 3&1)  &&
                    ((code >> 4&1) == type);
    bool sub2_UV =  (code >> 5&1)  &&
                    (code >> 3&1)  &&
                    ((code >> 4&1) == type);

if ((swap_UV && type==1) || (!swap_UV && type==0))
        ret = u;
    else
        ret = v;
    if ((flip_UV) {//add one because of u/v already adjusted to 0-1
        ret = 1.0 - ret;
    }
    if (add2_UV) {
        ret += 1.0;
    }
    else if (sub2_UV) {
        ret -= 1.0;
    }
}
}
```

FIG. 7B

APPROXIMATION OF LEVEL OF DETAIL CALCULATION IN CUBIC MAPPING WITHOUT ATTRIBUTE DELTA FUNCTION

CROSS REFERENCE TO RELATED APPLICATION

This application claims priority to U.S. Provisional Application Ser. No. 60/449,123, filed Feb. 20, 2003, and entitled "APPROXIMATION OF LEVEL OF DETAIL CALCULATION IN CUBIC MAPPING WITHOUT ATTRIBUTE DELTA FUNCTION," which application is incorporated herein by reference.

FIELD OF THE INVENTION

The present invention relates generally to environmental mapping in a computer graphics system and more particularly to environmental mapping and mip-mapping in a computer graphics system.

DESCRIPTION OF THE RELATED ART

Cubic mapping is a form of reflection mapping in which a cubic environmental map is used, as illustrated in FIG. 1A. The cubic environmental map is formed from six 2D maps, each of which is a surface, FACE0-FACE5 of the cube shown in FIG. 1A. Cubic mapping can be combined with mip-mapping by requiring that each 2D cubic surface is itself a mip-map, shown in FIG. 2, for which a level of detail (LOD) is specified. The LOD typically requires the calculation of the derivatives $$\frac{\partial u}{\partial x}, \frac{\partial u}{\partial y} \text{ and } \frac{\partial v}{\partial x}, \frac{\partial v}{\partial y}$$

of the texture coordinates (u, v) with respect to the screen coordinates (x, y). For example, according to Williams[1], the LOD is calculated as $$\max\left(\sqrt{\left(\frac{\partial u}{\partial x}\right)^2 + \left(\frac{\partial u}{\partial y}\right)^2}, \sqrt{\left(\frac{\partial v}{\partial x}\right)^2 + \left(\frac{\partial v}{\partial y}\right)^2}\right).$$

Although the derivatives can be obtained through the slope function of attributes and perspective division, for multipass texture rendering, these slope functions are too expensive to compute. Thus, an approximation of the derivative is used instead, by taking the delta difference of neighboring pixels' texture coordinates, where the screen coordinates differ by one. For example, if pixels p0 and p1 are adjacent in the x-direction, and p0 and p2 are adjacent in the y-direction, then $$\frac{\partial u}{\partial x} = u1 - u0 \text{ and } \frac{\partial u}{\partial y} = u2 - u0,$$

where u0 is the u-coordinate for pixel p0, u1 is the u-coordinate for pixel p1 and u2 is the u-coordinate for pixel p2. A problem occurs, however, in cubic mapping. There is no guarantee that the neighboring coordinates are mathematically continuous, which is required if the delta differences are to be a reasonable approximation of the derivative. This is true because u and v have been mapped according to certain rules to determine which face of the cube applies to a particular view vector and because the cubic face of neighboring pixels may not be the same.

FIG. 3 shows the assignment of u, v coordinates for each face of a cube according to the orthogonal coordinate system shown. In FIG. 3, for FACE 0, u has a−z direction and v has a−y direction. For FACE 1, u has a+z direction and v has a−y direction. For FACE 2, u has a+x direction and v has a+z direction. For FACE 3, u has a+x direction and v has a−z direction. For FACE 4, u has a+x direction and v has a−y direction, and for FACE 5, u has a−x direction and v has a−y direction.

The mapping rules are illustrated by the code fragment in FIG. 4. In this code fragment, each view vector has a before-mapping value (Nx, Ny, Nz) and an after-mapping value (U, V, Major, fid), where Nx, Ny and Nz are normals of cube surfaces, U, V are the u, v values, Major is the normal with the largest absolute value, and fid is the face id. The mapping algorithm compares the magnitude of each component normal and decides which cubic face a pixel belongs to i.e., should be mapped to. In particular, if the major is the negative x-axis, then the after-mapping value is (Nz, −Ny, −Nx, FACE_NEG_NX), if the major is the positive x-axis, then the after-mapping value is (−Nz, −Ny, Nx, FACE_POS_NX). FIG. 3 shows the cubic faces and the u, v axes for each face, given the coordinate system shown. Note that: between the +x and −x faces, the direction of u flips, but v stays the same; between the +y and −y faces, the direction of u is the same but the direction of v flips; and between the +z and −z faces, the direction of u flips but v stays the same.

The derivative is computed in accordance with the following approximation:

$$u = U/\text{Major}$$

$$\frac{du}{dx} = \frac{U + dU/dx}{\text{Major} + d\,\text{Major}/dx} - \frac{U}{\text{Major}}.$$

Therefore, after cross-multiplying and simplifying:

$$\frac{du}{dx} = \frac{\text{Major} \cdot (dU/dx) - U \cdot (d\,\text{Major}/dx)}{\text{Major} \cdot (\text{Major} + d\,\text{Major}/dx)},$$

where dU/dx=U1−U0 and dMajor/dx=Major1−Major0.

The above computation, however, has the problem that, in using the normalized delta, the continuity of normals of the pixels at different faces is assumed, but may not be true. Also, for each pixel, the computation requires three multiplications, two additions, and one division, all in floating point. The cost of this kind of computation is high and the precision is subject to the approximation of the normal delta. Thus, an improved computation, that avoids the continuity problem at the faces is desired.

BRIEF SUMMARY OF THE INVENTION

A method in accordance with the present invention is a method of performing cubic mapping with texturing. The method includes selecting neighboring pixels to be mapped, computing normals of the neighboring pixels, and mapping the normals of the pixels to faces of a cube, where neighboring pixels are mapped to adjacent faces of the cube and each face has an identifying number, and a LOD and a pair of texture coordinates for defining a mip-map for the face. The method further includes computing a level of detail (LOD) parameter for the texture coordinates of the neighboring pixels based on continuity-adjusted derivatives of the texture coordinates.

One advantage of the present invention is that the same LOD can be maintained for texture maps used on different faces of the cube.

Another advantage is that fewer computations are required to determine the LOD.

BRIEF DESCRIPTION OF THE DRAWINGS

These and other features, aspects and advantages of the present invention will become better understood with regard to the following description, appended claims, and accompanying drawings where:

FIG. 3 illustrates cubic faces with u, v orientation for each plane;

FIG. 4 sets forth a code fragment of the prior art;

FIG. 6 illustrates a table describing the codes of the present invention;

FIGS. 7A and 7B set forth a code fragment in accordance with the present invention.

DETAILED DESCRIPTION OF THE INVENTION

Figure 1A:
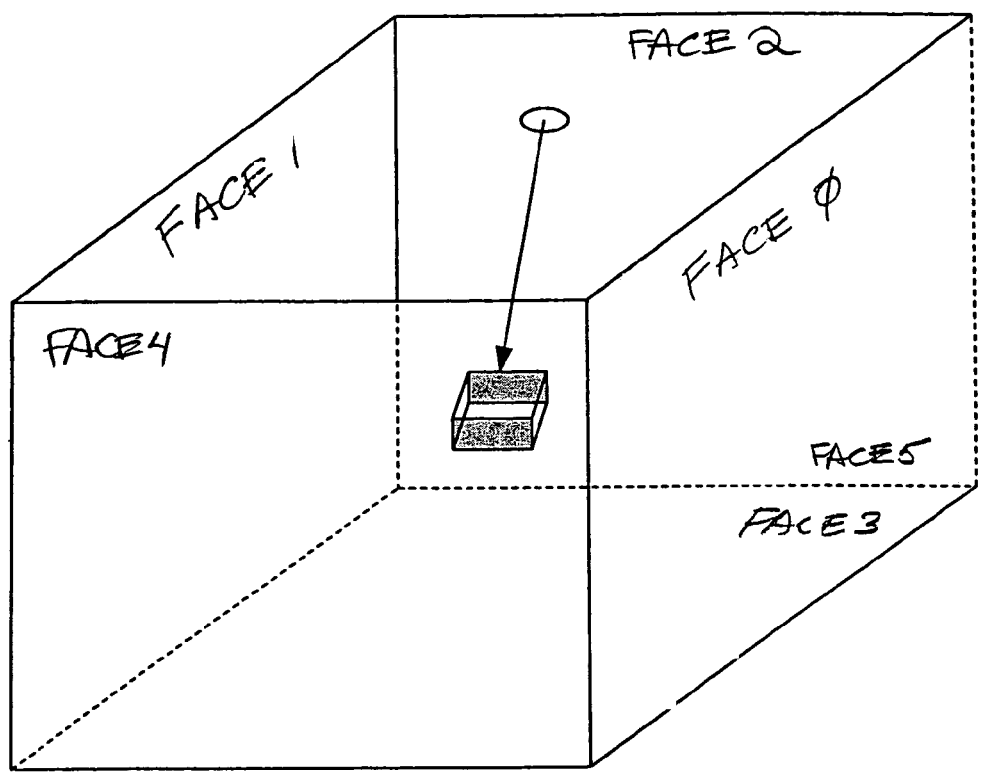
FIG. 1A illustrates cubic environmental mapping.
Figure 1B:
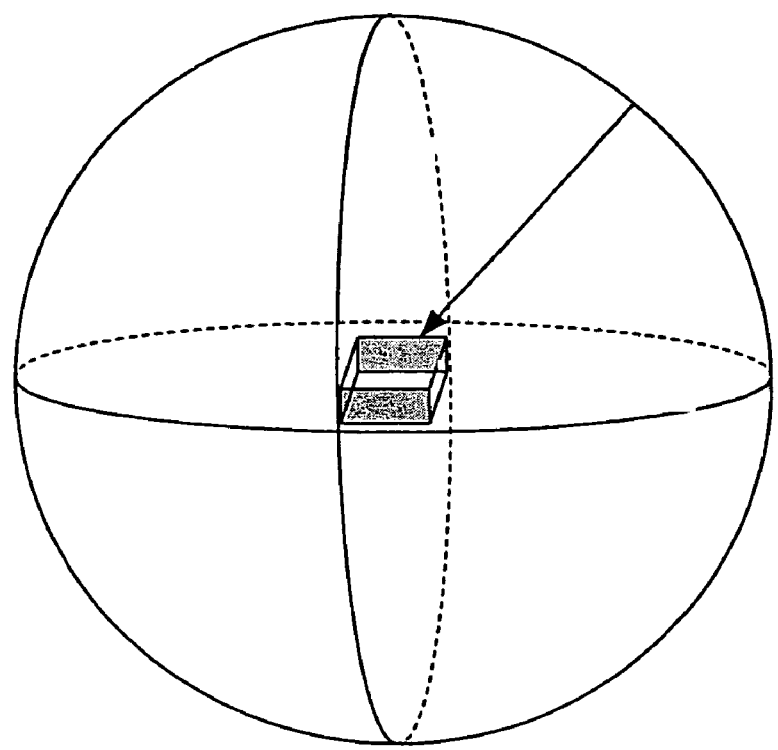
FIG. 1B illustrates spherical environmental mapping.
Figure 2:
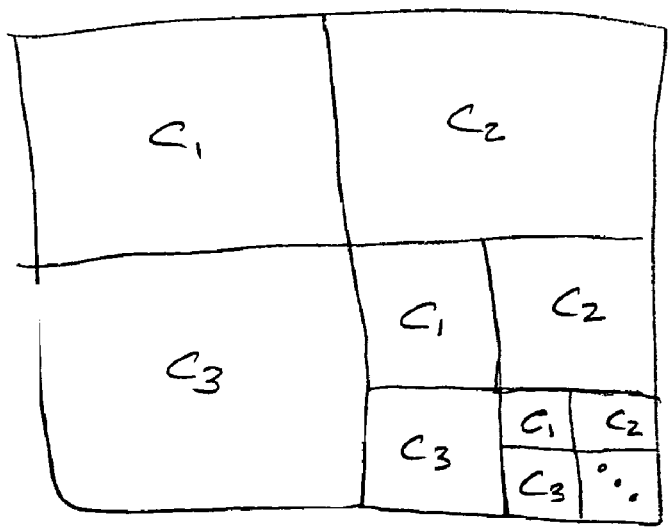
FIG. 2 illustrates mip-mapping.

Because cubic mapping is topologically similar to spherical mapping, shown in FIG. 1B, the boundary of the cubic faces should be smooth in terms of texture mapping. This means that the LOD crossing a cubic surface boundary should be smooth as well. Thus, neighboring pixels that are mapped to different faces should still have the same LOD. In the present invention, this is accomplished, by making u,v continuity adjustments after mapping, instead of using the neighboring normal and derivative formula together as in the prior art.

Figure 5:
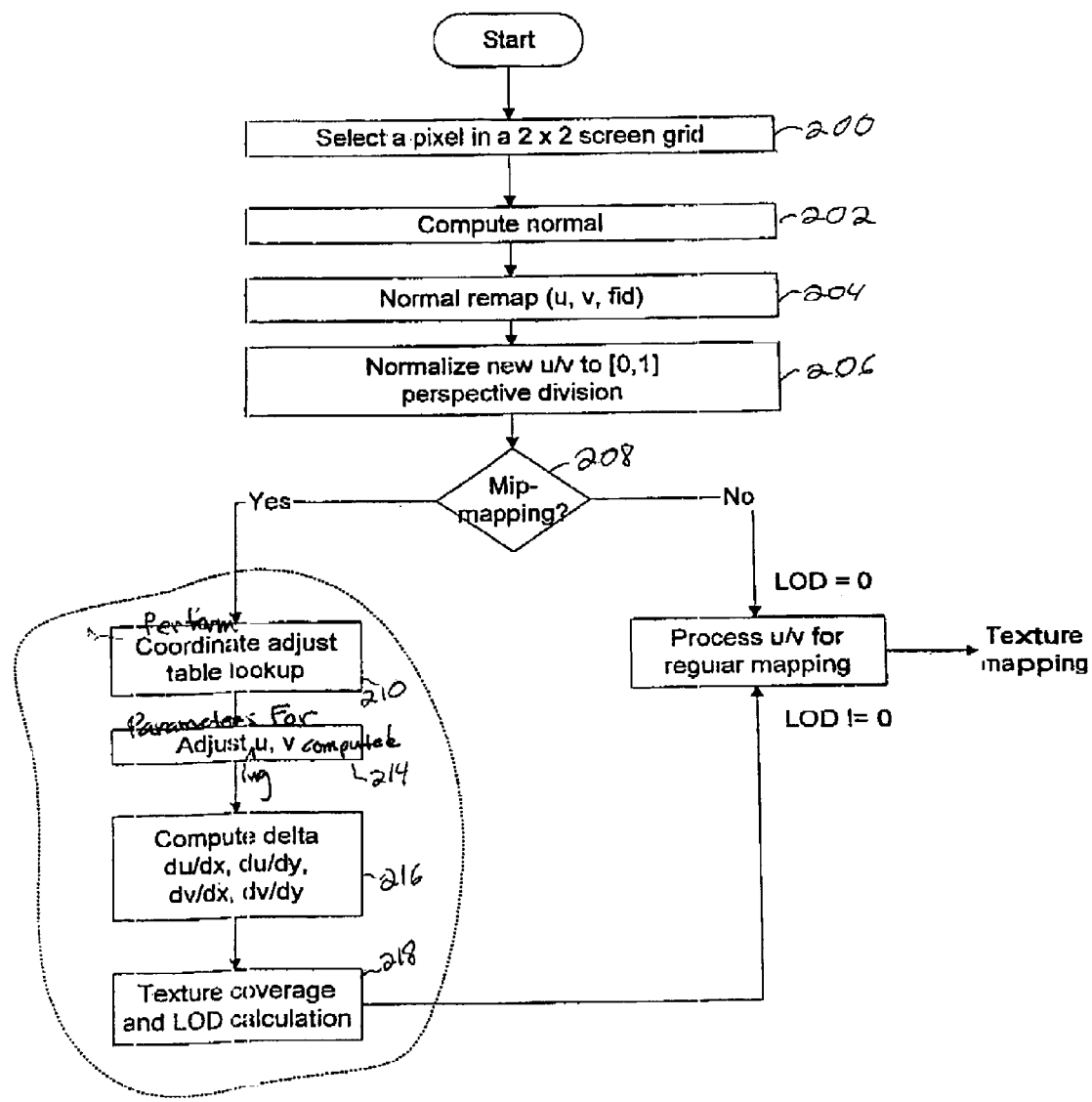
FIG. 5 sets forth a flow chart of the present invention.

FIG. 5 illustrates the steps for making the continuity adjustment of the present invention. First, a pixel with normal data (Nx, Ny, Nz) in a 2×2 screen grid, with pixels p0, p1, p2, and p3, is selected, in step 200. Next, in step 202, the normal data of the pixel is computed and, in step 204, mapped into the tuple (U, V, Major, fid), after which, in step 206, u and v are normalized to We range of [0, 1]. At this point, if mip-mapping is used in the texturing, as determined in step 208, a table is accessed using the face ids to obtain a continuity adjustment code in step 210. Parameters for adjusting the u and v axes are then computed, in step 214, and the adjusted derivatives are then computed using the computed parameters, in step 218. Finally, the LOD for the mipmap is determined and used for the texture mapping.

In making the continuity adjustments, there are three cases to consider. In the first case, neighboring pixels have different u values, but these values differ only in sign. For example, u1=Nx/Nz but u0=−Nx/Nz. Therefore, du/dx=u1−(−u0) is a good approximation. Alternatively, there can be a jump in the value between the faces. In this case, du/dx=1+u1−(−u0).

In the second case, neighboring pixels have u and v swapped; the value of u1=Nx/Nz is changed to Ny/Nz. In this case, du/dx=u1−v0 is a good approximation.

In the third case, neighboring pixels have v and Major swapped; the value of u1=Nx/Nz is changed to Nx/Ny. Because at the boundary of the faces, Nz=Ny, du=u1−u0 is a good approximation.

All other cases involving face changes are combinations of the above cases. Therefore, the texture coordinate adjustment across face boundaries involve combinations of a negation and a u/v swap. In practice, the u/v values are first computed, then normalized to the [0,1]range, and then the delta is computed. A texture coordinate adjustment may also have a third operation, add/subtract, to compensate for the normalization process.

To simplify a hardware implementation of the present invention, the operations needed for texture delta coordinate adjustment across face boundaries are tabulated. If two adjacent pixels have different faces, the table has an operation code for the delta adjustment.

The table is shown in FIG. 6. The bit definitions of the table entries are set forth below the table. Bit 0 indicates swapping of U and V, bits 2:1 are coded for indicating no flip, flip U, flip both, or flip V,. bits 3 is the need add bit, bit 4 indicates u or v, and bit 5 indicates add or subtract.

Reference to FIG. 3 is helpful to understanding the table. For example, if adjacent pixels have faces+x and +y, the orientations of the u, v axis from the +x face must be adjusted to match the +y face to maintain continuity. This adjustment requires that the u, v axes be swapped and that the v-axis direction be flipped. The table indicates that for X ⇒Y, a code of [001111] is correct. The lowest order bit (bit 0) of the entry indicates that u and v are swapped, the next two bits (bits 2, 1) indicate that v is flipped, the next bit (bit 3) indicates that an add is needed, and bits 5 and 4 indicate that u is the subject of the add. The transition Y ⇒X is similar but not identical. There must be a swap of u and v (bit 0) and a direction flip of u instead of v (bits 2:1). Moreover, there is a subtraction needed for v rather than an addition for u. The code for the transition Y ⇒X is [111011].

The table in FIG. 6 is shown in tabular form in FIG. 7A for use by the code fragment of FIG. 7B. The tabular table is indexed first by a lower order 6 bits which selects the face for the first adjacent pixel and a higher order six bits which selects the face for the second adjacent pixel. For example, if cube _adj_table [4, 3] is accessed, the face of the first adjacent pixel is +Z and the face for the second adjacent pixel is −Y.

Figure 8:
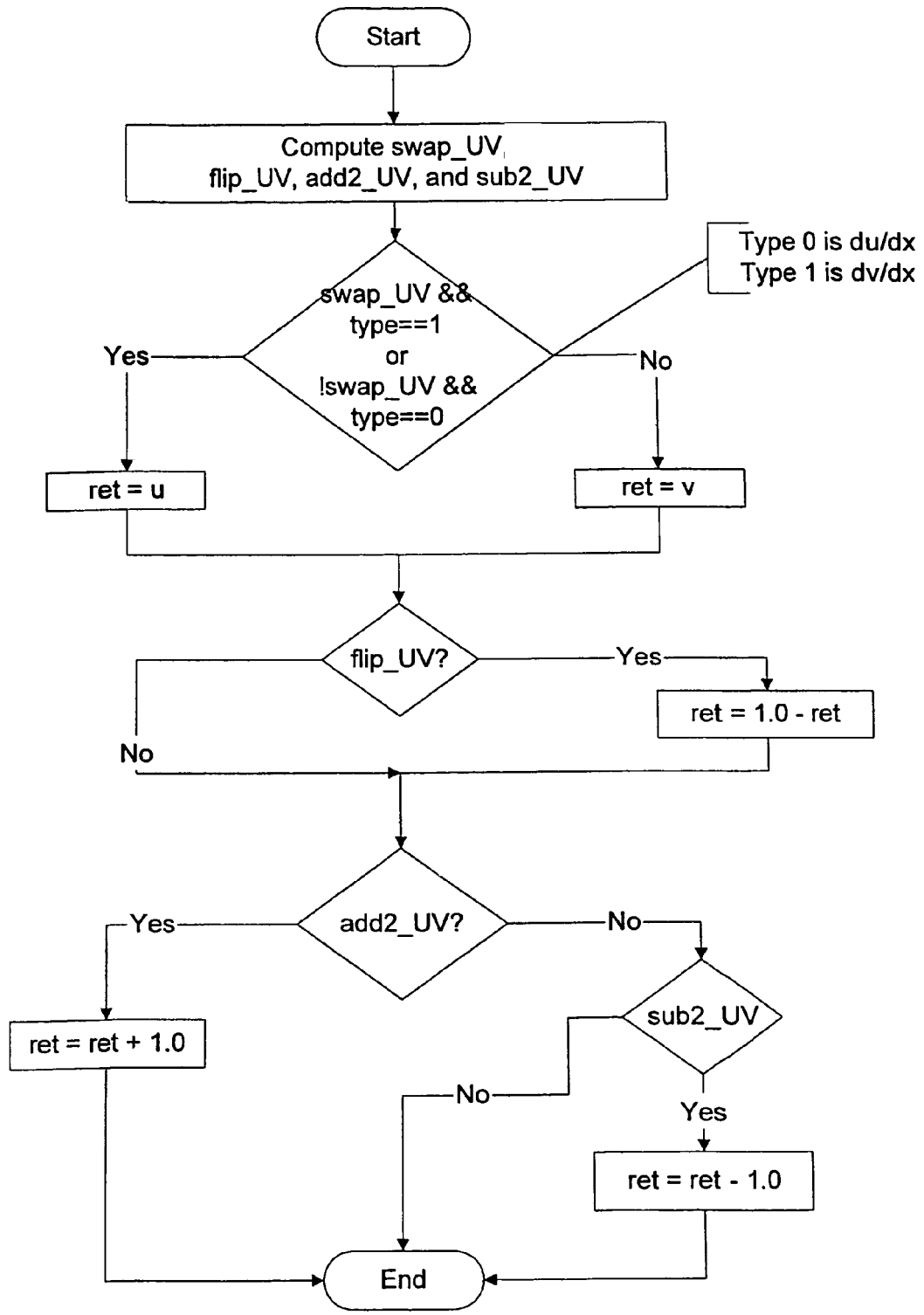
FIG. 8 shows a flow chart of the code fragment of the present invention.

The code fragment, shown in FIG. 7B and illustrated in FIG. 8 in flow chart form, uses the table to make the continuity adjustments of the present invention. In the code fragment, certain Boolean variables, swap_UV, flip_UV, add2_UV, sub2_UV, are computed after indexing the table with the face ids of the adjacent pixels. As discussed above, if the adjacent pixels map to the +X and +Y faces, then cube _adj_table[0,1 ]=0×0f=[001111] is chosen from the table. Next, the swap_UV variable is tested. If swap_UV is true and the case is type 1 or swap_UV is false and the case is type 0, then u is assigned to ret; otherwise v is assigned to ret. If flip_UV is true, then ret is adjusted by subtracting it from 1. This flips the sign of the u or v coordinate. Next, if add2_UV is true, ret is incremented by 1; other wise, if sub2_UV is true, ret is decremented by 1. This latter operation adjusts for a jump at the boundary (when normalized values are used).

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of performing cubic mapping with texturing, comprising:
    selecting neighboring pixels to be mapped;
    mapping each selected pixel to a cube face based on the magnitude of a normal vector for each face;
    for each of the faces to which the selected pixels are mapped, assigning a face id and defining the orientations of the texture axes of the faces in terms of the normal vectors of the cube faces, said texture axes being current texture axes;
    if the neighboring pixels do not have the same face id, changing the current texture axes of at least one of the faces based on assigned face ids to make the current texture axes consistent and continuous between the faces;
    computing an approximation to derivatives of the texture coordinates based on the current texture axes; and
    computing, based on continuity-adjusted derivatives, a level of detail (LOD) parameter for the texturing of said pixels.

2. A method of performing cubic mapping as recited in claim 1, wherein the step of changing the current texture axes based on the assigned face ids:
    obtaining a continuity adjustment code based on the assigned face ids; and
    updating the current texture axes of at least one of the faces based on the adjustment code to make the current texture axes consistent and continuous between the faces.

3. A method of performing cubic mapping as recited in claim 2, wherein the continuity adjustment code is obtained from a table of codes, the table being indexed by the face ids.

4. A method of performing cubic mapping as recited in claim 2,
    wherein the approximation to the derivative of the texture coordinates is based on the difference between the texture coordinates of the neighboring pixels; and
    wherein updating the current texture axes includes swapping orientation of the current texture axes of one of the faces.

5. A method of performing cubic mapping as recited in claim 4,
    further comprising the step of normalizing the texture coordinates prior to computing the LOD parameter; and
    wherein updating the current texture axes includes compensating for the normalizing step.

6. A method of performing cubic mapping as recited in claim 5, wherein the step of compensating includes adding or subtracting one.

7. A method of performing cubic mapping as recited in claim 2,
    wherein the approximation to the derivative of the texture coordinates is based on the difference between the texture coordinates of the neighboring pixels; and
    wherein updating the current texture axes includes flipping the orientation of one of the current texture axes of one of the faces.

8. A method of performing cubic mapping as recited in claim 7,
    further comprising the step of normalizing the texture coordinates prior to computing the LOD parameter; and
    wherein updating the current texture axes includes compensating for the normalizing step.

9. A method of performing cubic mapping as recited in claim 8, wherein the step of compensating includes adding or subtracting one.

10. A program storage device readable by a machine tangibly embodying a program of instructions executable by a machine to perform a method of cubic mapping with texturing, said method comprising:
    selecting neighboring pixels to be mapped;
    mapping each selected pixel to a cube face based on the magnitude of a normal vector for each face;
    for each of the faces to which the selected pixels are mapped, assigning a face id and defining the orientations of the texture axes of the faces in terms of the normal vectors of the cube faces, said texture axes being current texture axes:
    if the neighboring pixels do not have the same face id, changing the current texture axes of at least one of the faces based on assigned face ids to make the current texture axes consistent and continuous between the faces; and
    computing an approximation to derivatives of the texture coordinates based on the current texture axes; and
    computing, based on the approximations of the derivatives, a level of detail (LOD) parameter for the texturing of said pixels.

11. The program storage device of claim 10, wherein the step of changing the current texture axes based on the assigned face ids includes:
    obtaining a continuity adjustment code based on the assigned face ids;
    updating the current texture axes of at least one of the faces based on the adjustment code to make the current texture axes consistent and continuous between the faces.

12. The program storage device of claim 11, wherein the continuity adjustment code is obtained from a table of codes, the table being indexed by the face ids.

13. The program storage device of claim 11,
    wherein the approximation to the derivative of the texture coordinates is based on the difference between the texture coordinates of the neighboring pixels; and
    wherein updating the current texture axes includes swapping orientation of the current texture axes of one of the faces.

14. The program storage device of claim 13,
    further comprising the step of normalizing the texture coordinates prior to computing the LOD parameter; and
    wherein updating the current texture axes includes compensating for the normalizing step.

15. The program storage device of claim 14, wherein the step of compensating includes adding or subtracting one.

16. The program storage device of claim 11,
    wherein the approximation to the derivative of the texture coordinates is based on the difference between the texture coordinates of the neighboring pixels; and
    wherein updating the current texture axes includes flipping the orientation of one of the current texture axes of one of the faces.

17. The program storage device of claim 16,
    further comprising the step of normalizing the texture coordinates prior to computing the LOD parameter; and wherein updating the current texture axes includes compensating for the normalizing step.

18. The program storage device of claim 17, wherein the step of compensating includes adding or subtracting one.

* * * * *